United States Patent [19]

Shimotashiro et al.

[11] Patent Number: 5,313,346
[45] Date of Patent: May 17, 1994

[54] TRACKING ERROR DETECTION SYSTEM HAVING AT LEAST TWO MAGNETIC HEADS WITH OPPOSITE AZIMUTHS AND CIRCUITRY FOR DETECTING TRACKING ERROR BY DETERMINING A PHASE DIFFERENCE OF OUTPUT SIGNALS FROM ALL CIRCUITS BASED ON SIGNALS PRODUCED BY THE MAGNETIC HEADS

[75] Inventors: Masafumi Shimotashiro, Neyagawa; Tetsuya Mizushima, Yawata; Hiroshi Okamoto, Nara; Souichiro Fujioka, Sakai, all of Japan

[73] Assignee: Matsushita Electric Industrial Co., Ltd., Osaka, Japan

[21] Appl. No.: 974,356

[22] Filed: Nov. 10, 1992

Related U.S. Application Data

[63] Continuation of Ser. No. 552,515, Jul. 16, 1990, abandoned.

[30] Foreign Application Priority Data

Jul. 21, 1989 [JP] Japan .................. 1-189702
Sep. 20, 1989 [JP] Japan .................. 1-243784

[51] Int. Cl.$^5$ .......................... G11B 5/584; G11B 5/09
[52] U.S. Cl. .................................. 360/77.130; 360/51
[58] Field of Search ............... 360/77.01, 77.02, 77.06, 360/77.07, 77.08, 77.11, 77.12, 77.13, 77.14, 77.15, 77.16, 76

[56] References Cited

U.S. PATENT DOCUMENTS

| | | | |
|---|---|---|---|
| 4,209,810 | 6/1980 | Ragle et al. | 360/77.06 |
| 4,527,207 | 7/1985 | Owaki et al. | 360/73.13 |
| 4,746,976 | 5/1988 | Furuhaton et al. | 360/76 |
| 5,057,949 | 10/1991 | Suga et al. | 360/77.16 |

FOREIGN PATENT DOCUMENTS

| | | |
|---|---|---|
| 0040066 | 11/1981 | European Pat. Off. . |
| 0355721 | 2/1990 | European Pat. Off. . |
| 2360222 | 2/1978 | France . |
| 8602190 | 4/1986 | World Int. Prop. O. . |

OTHER PUBLICATIONS

Yamada, et al., "Tracking servo System Using Four-Different Frequency Pilot Signals", National Technical Report, vol. 31, No. 6, pp. 115–124, Dec. 1985.
"Standardization of '8mm Video'", Television Digest, vol. 23:14, Apr. 4, 1983.
Ryo Takahashi (Nippon Hoso Kyokai), "VTR Technology", pp. 72–75.

*Primary Examiner*—Donald Majec
*Assistant Examiner*—Won Tae C. Kim
*Attorney, Agent, or Firm*—Stevens, Davis, Miller & Mosher

[57] ABSTRACT

Disclosed is a tracking error detection system in a digital magnetic recording/reproducing apparatus for recording/reproducing a digital signal, in which a digital signal recorded by means of a magnetic head having an azimuth is reproduced to thereby produce a reproduction clock signal and the phase or period of the reproduction clock signal is measured to thereby detect a tracking error. Since the tracking error can be known every time the phase or period of the reproduction clock signal is measured, it is possible to detect the tracking error including the linearity of a recording track and it is possible to improve the accuracy in tracking error detection. Further, since no pilot signal or the like is frequency-multiplexed on a low frequency, the recording digital is not affected.

2 Claims, 10 Drawing Sheets

TRACKING ERROR DETECTION SYSTEM HAVING AT LEAST TWO MAGNETIC HEADS WITH OPPOSITE AZIMUTHS AND CIRCUITRY FOR DETECTING TRACKING ERROR BY DETERMINING A PHASE DIFFERENCE OF OUTPUT SIGNALS FROM ALL CIRCUITS BASED ON SIGNALS PRODUCED BY THE MAGNETIC HEADS

This application is a continuation of application Ser. No. 07/552,515, filed Jul. 16, 1990, now abandoned.

BACKGROUND OF THE INVENTION

1. Field of the Invention

The present invention relates to a tracking error detection system for detecting tracking errors in a magnetic recording/reproducing apparatus for recording/reproducing digital signals.

2. Description of the Prior Art

Conventionally, in a tracking error detection system used in home-use VTR sets, a control track is provided in the longitudinal direction on a magnetic tape, separately from a video track on which recording/ reproducing of video signals are effected, so that pulses indicating a rotational phase of a head drum are recorded as a control signal on the control track, whereby, in reproduction, the phase of a reproduced control signal is compared with that of the pulses indicating rotation of the head drum to thereby detect a tracking error. (For example, reference is made to "VTR Technology", supervised by Ryo Takahashi, Japan Broadcasting Corporation (NHK)).

On the other hand, in a tracking error detection system used in 8 mm videos, four low-frequency pilot signals different in frequency from one another are established and those four low-frequency pilot signals are recorded one by one on every video track so that every pilot signal is frequency-multiplexed with a video signal on the track. In reproduction, two low-frequency pilot signals recorded on two adjacent video tracks are detected as cross-talk from adjacent video tracks and a power difference between the two detected low-frequency pilot signals are compared with each other to thereby detect a tracking error.

In such a conventional method using a control track, however, it is impossible to detect the linearity of a recording track and it is very difficult to improve the accuracy in tracking error detection.

In the tracking error detection system used in 8 mm videos, on the other hand, it is possible to detect the linearity of the video track, however, the frequency-multiplexing of a low-frequency pilot signal with a digital video signal causes a problem that the pilot signal acts as a disturbance against the digital signal because such a digital signal used in a digital magnetic image recording/reproducing apparatus includes signal components even in a low frequency band.

SUMMARY OF THE INVENTION

It is therefore an object of the present invention to eliminate the disadvantages in the above mentioned conventional art.

It is another object of the present invention to provide a tracking error detection system in which the linearity of a recording track can be detected, the accuracy in tracking error detection can be improved, and no disturbance is given against the digital signal.

In order to attain the above objects, according to a first aspect of the present invention, the tracking error detection system comprises a multi-head magnetic head having multiple magnetic heads respectively having azimuths opposite to each other, PLL circuits for generating reproduction clock signals on the basis of digital signals produced from the multiple magnetic heads respectively, and a phase comparator circuit for comparing the respective phases of the output signals produced from the PLL circuits.

With this construction, the respective time bases of the two digital signals reproduced by the multiple magnetic heads having azimuths opposite to each other vary in the directions opposite to each other when the multiple magnetic heads come out of the recording track. Accordingly, it is possible to detect a tracking error by comparing the respective phases of the reproduction clock signals which move in proportion to the variations of the time bases respectively. Accordingly, the linearity of a recording track can be detected simultaneously with the tracking error detection, so that it is possible to improve the accuracy in tracking error detection.

According to a second aspect of the present invention, the tracking error detection system comprises: a magnetic head having an azimuth, a PLL circuit for generating a reproduction clock signal on the basis of a digital signal outputted from the magnetic head, a frequency-dividing circuit for dividing the frequency of the reproduction clock signal, and a period measuring circuit for measuring the period of an output signal from the frequency-dividing circuit. Preferably, the period measuring circuit includes a counter for measuring the period of an output signal from the frequency-dividing circuit, and a clock generator circuit for generating a free oscillation clock signal for actuating the counter to operate.

With this construction, the period of the reproduction clock signal varies when the magnetic head comes out of the recording track. Accordingly, a tracking error is detected by measuring the period of the reproduction clock signal or the period of a signal obtained by dividing the frequency of the reproduction clock signal. Accordingly, the linearity of a recording track can be detected simultaneously with the tracking error detection, so that it is possible to improve the accuracy in tracking error detection. Further, the digital signal is not affected by a low frequency signal component because no low-frequency pilot signal is frequency-multiplexed.

According to a third aspect of the present invention, the tracking error detection system comprises a multi-head magnetic head having two magnetic heads disposed in a multiple configuration and having azimuths opposite to each other, a PLL circuit for generating a reproduction clock signal on the basis of a digital video signal outputted from one of the two magnetic heads, a frequency-dividing circuit for dividing the frequency of the reproduction clock signal, and a period measuring circuit for measuring the period of an output signal from the frequency-dividing circuit. Preferably, the period measuring circuit includes a counter for measuring the period of an output signal from the frequency-dividing circuit, a second PLL circuit for generating a reproduction clock signal on the basis of a digital video signal outputted from the other one of the two magnetic heads, and a frequency multiplying circuit for multiplying the reproduction clock signal from the second PLL circuit so as to generate a clock signal for actuating the counter to operate.

In this construction according to the third aspect of the present invention, the following effect can be obtained in addition to the effects obtained in the construction according to the second aspect of the present invention. That is, since a tracking error is detected on the basis of a ratio between the periods of the two reproduction clock signals reproduced by the multiple magnetic heads having azimuths opposite to each other, the accuracy in tracking error detection is higher than that in the construction according to the second aspect of the present invention, and since no influence is given by jitter, it is possible to perform tracking error detection with higher accuracy.

BRIEF DESCRIPTION OF THE DRAWINGS

Other features and advantages of the present invention will be apparent from the following description taken in connection with the accompanying drawings, wherein.

DESCRIPTION OF THE PREFERRED EMBODIMENTS

Embodiments of the present invention will be described with reference to the accompanying drawings hereunder.

Figure 1:
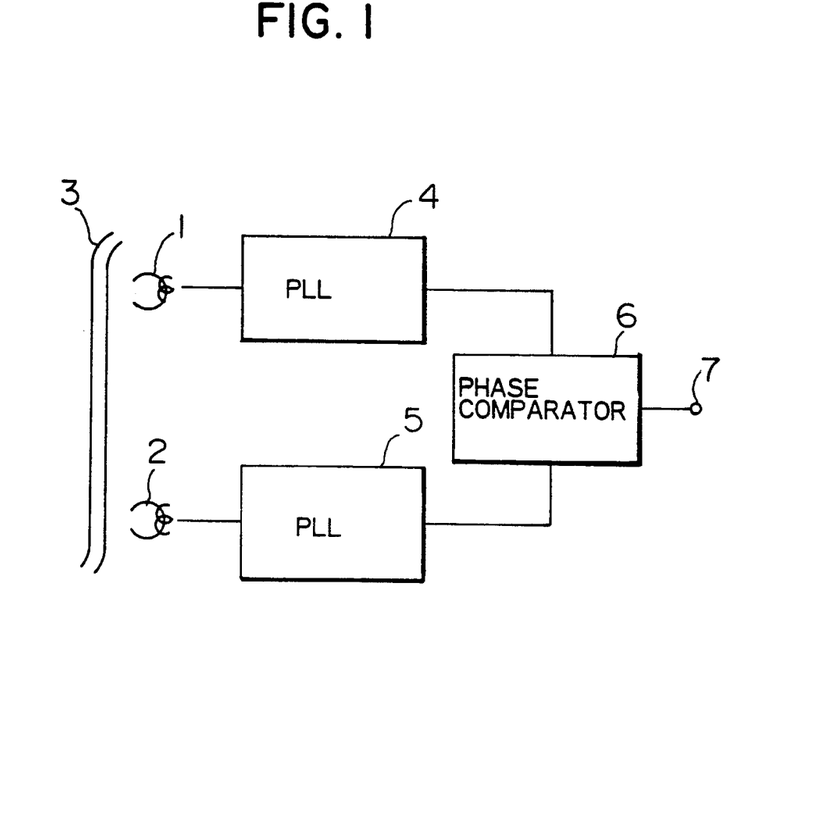
FIG. 1 is a block diagram illustrating main part of a first embodiment of the tracking error detection system having a first configuration according to the present invention.
Figure 2:
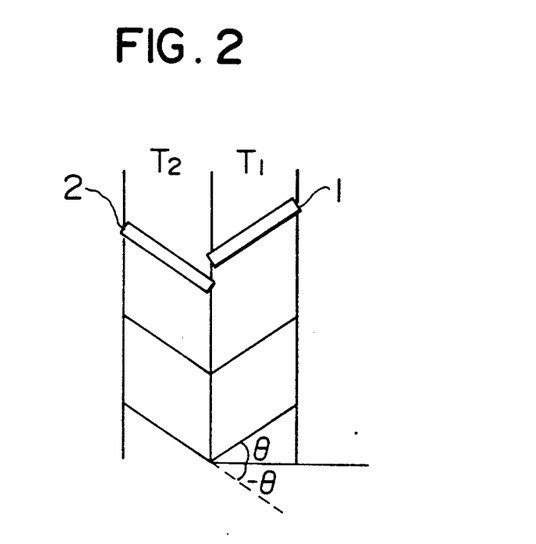
FIG. 2 is a diagram illustrating a recording pattern on a magnetic tape according to the present invention.

FIG. 1 is a block diagram showing main portions of an embodiment of the tracking error detection system having a first configuration according to the present invention, and FIG. 2 is a diagram showing a recording pattern on a magnetic tape. In FIG. 2, the reference numerals 1 and 2 designate multiple magnetic heads disposed on a single base. Representing the value of an azimuth by $\theta$, the azimuths of the respective magnetic heads 1 and 2 opposite to each other take values of $\theta$ and $-\theta$ respectively. If tracking is displaced left in FIG. 2, the power center position of a track $T_1$ to be reproduced by head 1 of the magnetic heads is displaced left downward in the drawing, so that the time base varies to generate a delay. The power center position of a track $T_2$ to be reproduced by the other head 2 of the magnetic heads, on the contrary, is displaced left upward in the drawing, so that the time base varies to generate an advance. Further, variations in time base are caused by expansion/contraction of a magnetic tape and unevenness in a rotation of a rotary cylinder in reproducing operation. However, the variations in time base are the same with each other between the magnetic heads 1 and 2 because the magnetic heads 1 and 2 are disposed on a single base, and therefore cause no problem.

Next, returning to FIG. 1, description will be made as to the construction of the tracking error detection system. A digital signal recorded on a magnetic tape 3 is reproduced by the magnetic heads 1 and 2, and the outputs of the magnetic heads 1 and 2 are supplied to PLL (phase-locked loop) circuits 4 and 5 respectively.

Figure 3:
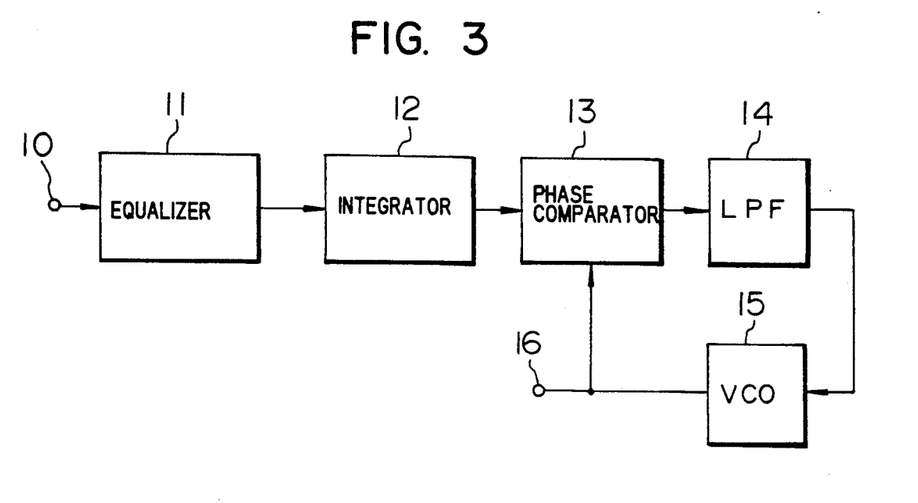
FIG. 3 is a block diagram illustrating main part of the configuration of the PLL circuit according to the present invention.

The PPL circuits 4 and 5 are the same in configuration with each other. FIG. 3 shows the configuration of each PLL circuit in detail. Each PLL circuit is constituted by an input terminal 10, an equalizer circuit 11, an integrating circuit 12, a phase comparator 13, a low-pass filter (LPF) 14, a voltage-controlled oscillation circuit (VCO) 15, and an output terminal 16. The reproduced signal, that is, the output signal of the corresponding magnetic head, is supplied to the equalizer circuit 11 through the input terminal 10. The equalizer circuit 11 is constituted by a reproduction amplifier circuit and a transversal filter so as to amplify the received digital signal and then correct the frequency characteristic of the amplified digital signal to make the frequency characteristic be a differential characteristic. The thus obtained digital signal, that is, the output of the equalizer circuit, is supplied to the integrating circuit 12. The integrating circuit 12 integrates the input signal to convert it so as to make it have the same cosine roll-off waveform as that of the original digital signal. The phase comparator 13, the low-pass filter 14, and the voltage-controlled oscillation circuit 15 constitute a so-called phase-locked loop for generating a reproduction clock phase-synchronized with the reproduced digital signal, the reproduction clock being put out through the output terminal 16.

Figure 4A:
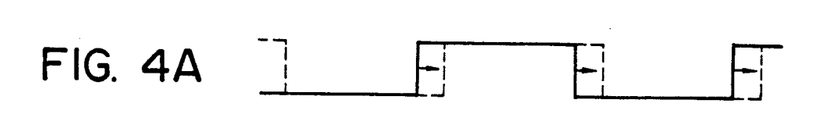
FIG. 4A–4C is waveform diagram for explaining the method of phase comparison according to the present invention.
Figure 4B:
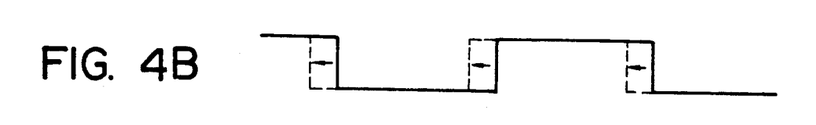
Figure 4C:
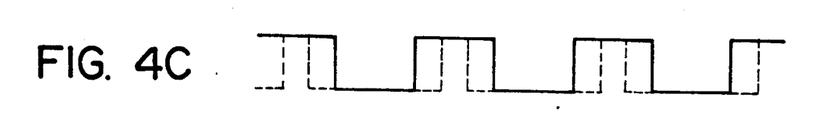

The reproduction clock signals produced from the respective PLL circuits 4 and 5 are supplied to a phase comparator 6. In an embodiment of the phase comparator 6 in which the two reproduction clock signals are subject to exclusive-ORing, the respective phases of the reproduction clock signals produced from the PLL circuits 4 and 5 as shown in the diagrams (a) and (b) in FIG. 4 are compared with each other to thereby obtain an output as shown in the diagram (c) of FIG. 4.

Next, description will be made as to another embodiment of the tracking error detection system having the first configuration according to the present invention with reference to the main portion block diagram of FIG. 5, etc.

In the foregoing embodiment of FIG. 1, if the displacement of tracking becomes larger than the period of the reproduction clock signal, the phase width of a time base variation exceeds the edge of the reproduction clock signal, so that the outputs after phase comparison do not have a one-to-one correspondence. That is, the dynamic range is narrow. In the embodiment of FIG. 5, therefore, the problem concerning the dynamic range is solved.

Figure 6A:
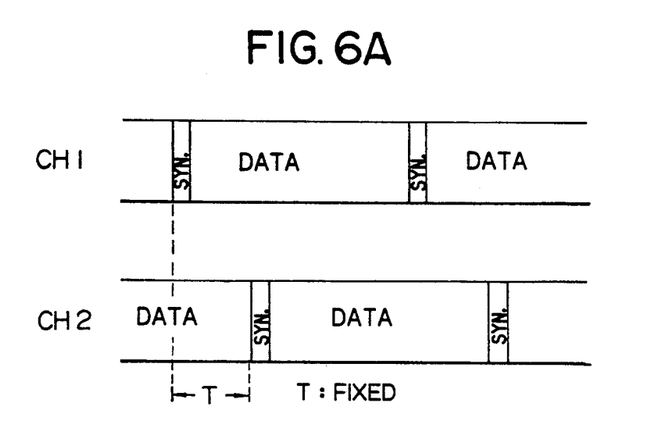
FIG. 6A is a diagram illustrating the synchronizing pattern recording timing according to the present invention.
Figure 6B:
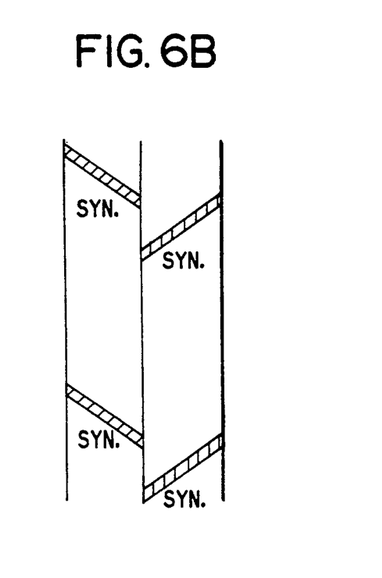
FIG. 6B is a diagram illustrating the recording pattern on a magnetic tape according to the present invention.

That is, generally, synchronizing patterns each showing a time base reference used in a recording format of a digital magnetic recording system are arranged so as to have a fixed mutual relationship (T may be set to zero) with respect to the time base between channels 1 (ch1) and 2 (ch2) as shown in FIG. 6A, and recording is made with the recording patterns with such azimuths as shown in FIG. 6B so as to make the signal patterns be pilot signals for enlarging the dynamic range.

Next, referring to FIG. 5, the tracking error detection system will be described. At the reproduction side, a magnetic tape 21, multiple magnetic heads 22 and 23, and PLL circuits 24 and 25 are the same in configuration basically as those in the foregoing embodiment of FIG. 1. A reproduction clock signal of the channel 1 which is the output of a VCO 34 is supplied to a frequency dividing circuit 38, and a reproduction clock signal of the channel 2 which is the output of a VCO 35 is supplied to a frequency dividing circuit 39, so that the reproduction clock signals are frequency-divided in order to enlarge the dynamic range. If the frequency division is performed, however, the phase to be taken increases by a value corresponding to the frequency dividing ratio, and therefore it is impossible to determined the phase with no ambiguity. Accordingly, the foregoing synchronizing patterns are detected by synchronization detection circuits 36 and 37 which generate pulses when they find patterns coincident with the synchronizing patterns in data trains from integrating circuits 28 and 29 respectively. The detected synchronizing patterns are sent to the frequency dividing circuits 38 and 39 as the time base references so that the phases are determined with no ambiguity. FIG. 7 shows the process in which the phase is determined. That is, the diagrams A, B, and C show the synchronizing pattern of the channel 1, the output of the frequency dividing circuit 38, and the reproduction clock signal, respectively, and the diagrams D, E, and F show the synchronizing pattern of the channel 2, the output of the frequency dividing circuit 39, and the reproduction clock signal respectively. That is, the phases of the signals B and E are determined on the basis of the time base positions of the signals A and D. Finally, the outputs of the frequency dividing circuits 38 and 39 are supplied to a phase comparator 40 so that the phases are compared with each other in the same manner as in the case of the embodiment of FIG. 1, and the quantity and direction of a tracking error are produced.

Figure 7A:
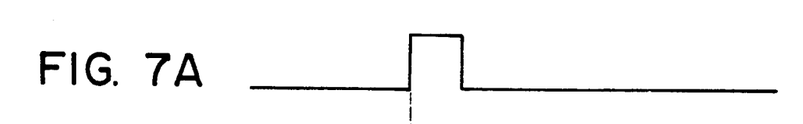
FIG. 7A–7F is waveform diagram showing phase timing of the frequency dividing circuit according to the present invention.
Figure 7B:
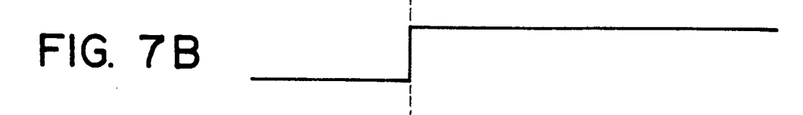
Figure 7C:
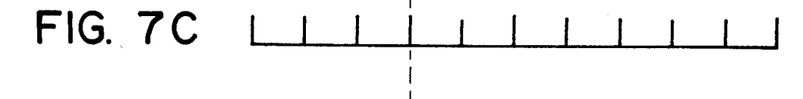
Figure 7D:
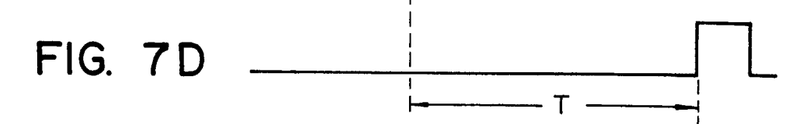
Figure 7E:
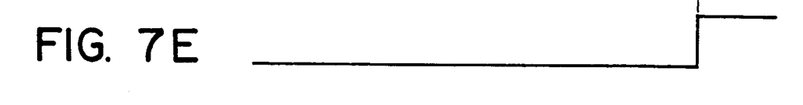
Figure 7F:
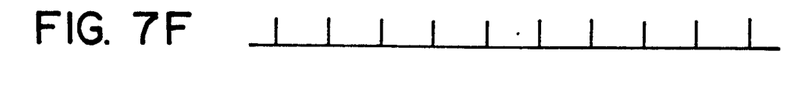

As described above, by use of the embodiment of FIG. 5, the dynamic range can be enlarged. Further, in the case of considering the interchangeability of the digital magnetic recording system, the period T of FIG. 7 is sometimes different from the period T in recording shown in FIG. 6A because of errors in secure positions of the multiple magnetic heads 1 and 2. However, no problem is caused when the dynamic range is sufficiently larger than the attachment position errors.

Figure 5:
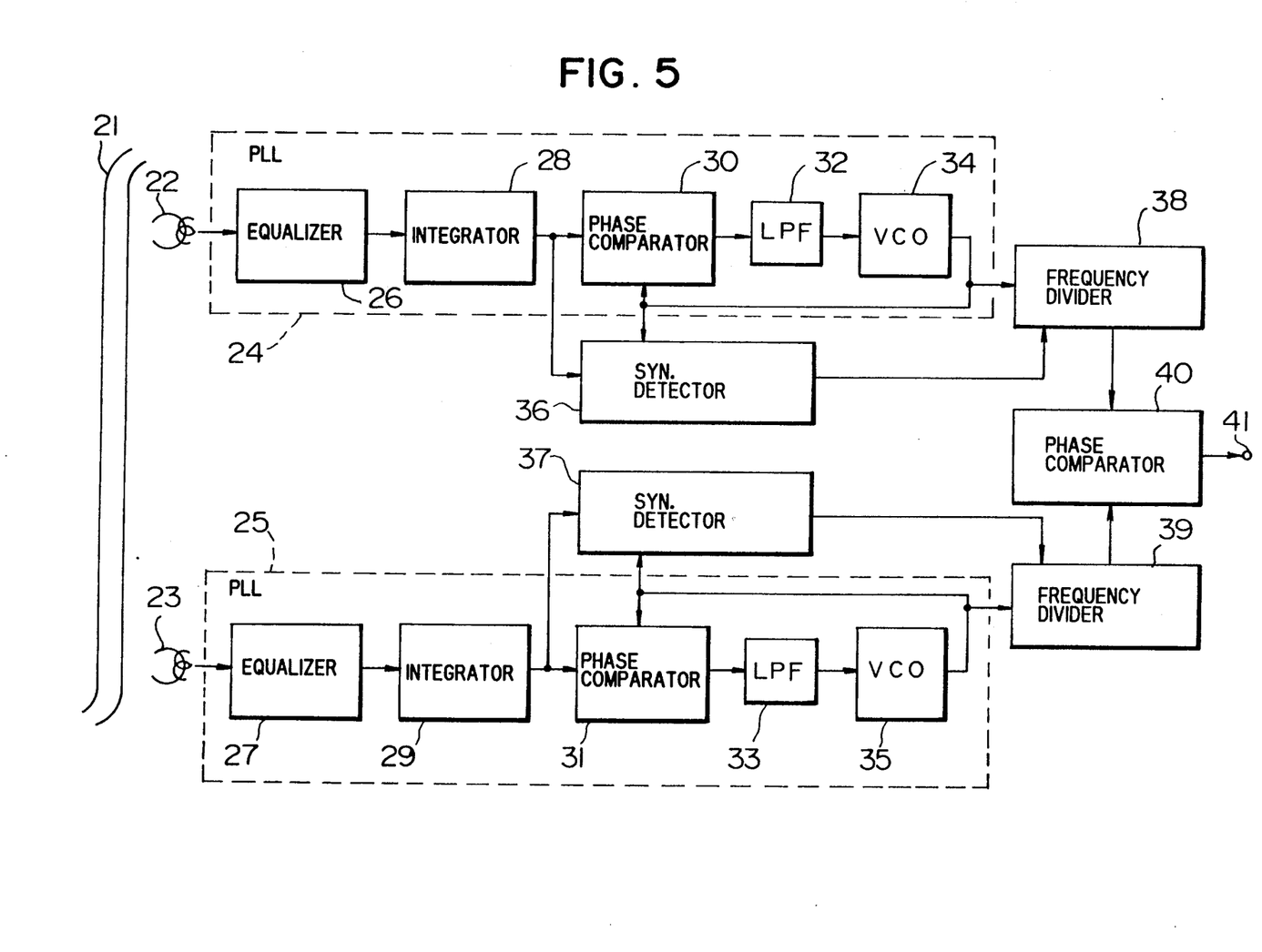
FIG. 5 is a block diagram illustrating main part of modification of the second embodiment of the tracking error detection system having a first configuration according to the present invention.

Although description has been made as to the configuration in which the reproduction clock signals are frequency-divided in the embodiment of the present invention shown in FIG. 5, the same effects as those of the embodiment of FIG. 5 can be obtained also when the phases of the pulses of the channels 1 and 2 showing the time bases of the synchronizing patterns are compared with each other.

Figure 8:
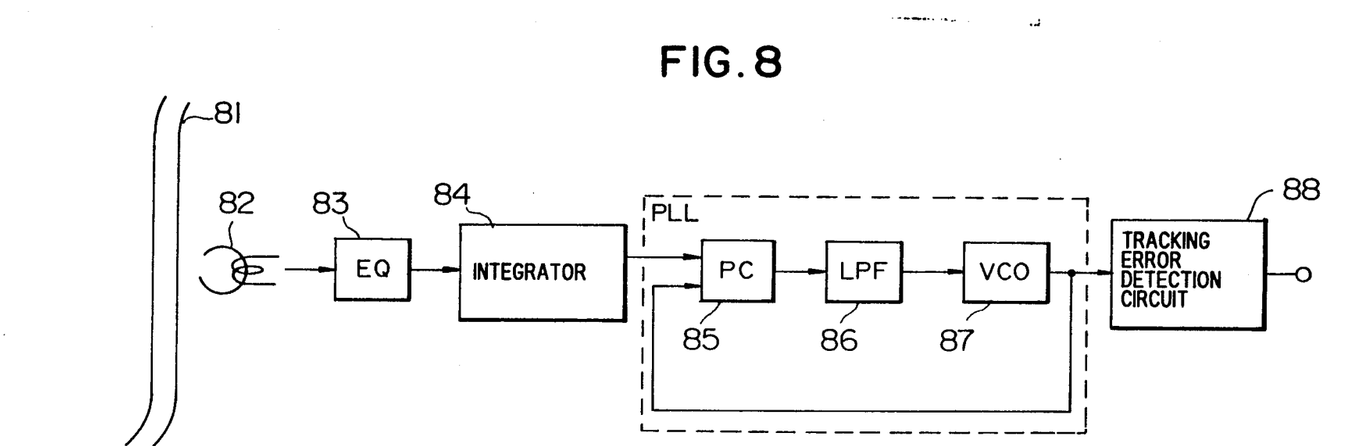
FIG. 8 is a block diagram illustrating main part of an embodiment of the tracking error detection system having a second configuration according to the present invention.

FIG. 8 is a block diagram showing main portions of an embodiment of the tracking error detection system having a second configuration according to the present invention. In the drawing, the system includes: a magnetic tape 81; a magnetic head having an azimuth 82, an equalizer circuit (EQ) 83 constituted by a reproduction amplifier circuit and a transversal filter so as to amplify the digital signal reproduced by the magnetic head and then correct the frequency characteristic of the amplified digital signal to make the frequency characteristic be a differential characteristic; an integrating circuit 84 for integrating the output of the equalizer circuit 83 so as to convert it to make it have the same cosine roll-off waveform as that of the original digital signal; a phase comparator (PC) 85; a low-pass filter (LPF) 86; a voltage-controlled oscillation circuit (VCO) 87; a tracking error detection circuit 88 for detecting a tracking error from the reproduction clock signal; and an output terminal 89. The phase comparator 85, the low-pass filter 86, and the voltage-controlled oscillation circuit 87 constitute a usual phase-locked loop (PLL) circuit which generates a reproduction clock phase-synchronized with the reproduced digital signal.

Figure 9:
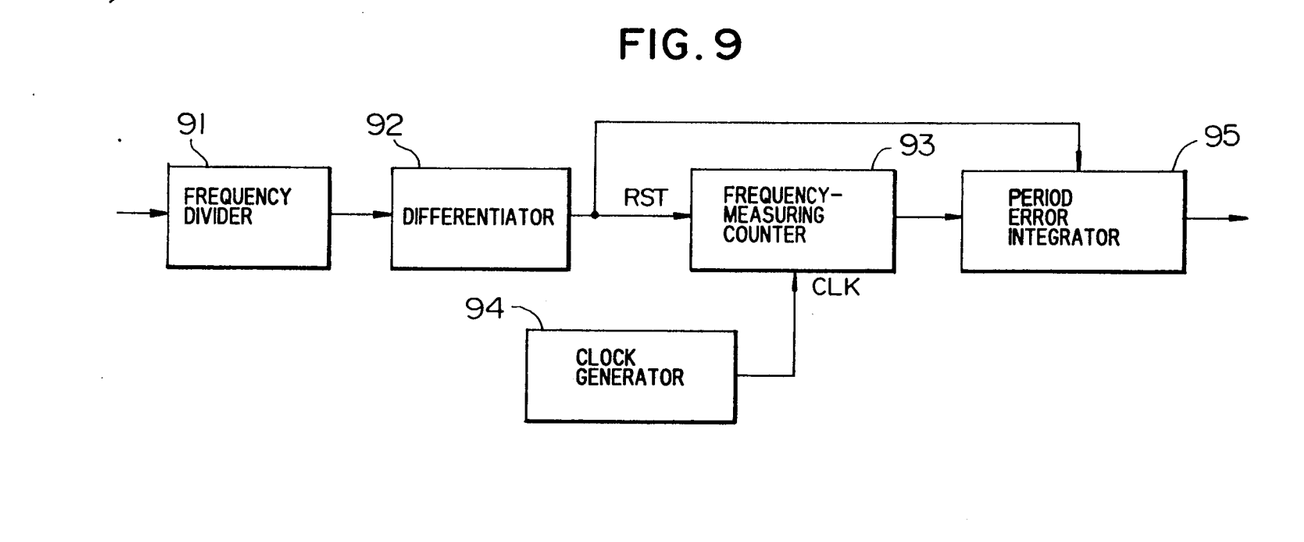
FIG. 9 is a block diagram illustrating main part of the tracking error detection circuit 88.

FIG. 9 is a block diagram showing the configuration of the tracking error detection circuit 88 of FIG. 8. In FIG. 9, the tracking error detection circuit 88 includes: a frequency dividing circuit 91 for dividing the frequency of a reproduction clock signal; a differential circuit 92 for generating a one-shot pulse at the leading edge of the output of the frequency dividing circuit 91; a counter 93 for measuring the period of a pulse which is the output of the differential circuit 92; a free oscillation clock generation circuit 94 for making the period measuring counter 93 operate; and an integrating circuit 95 for integrating a difference between the period actually measured by the period measuring counter 93 and a reference value, that is the period in normal tracking operation.

The operation of the tracking error detection circuit 88 will be described hereunder with reference to FIGS. 8 and 9.

Figure 10A:
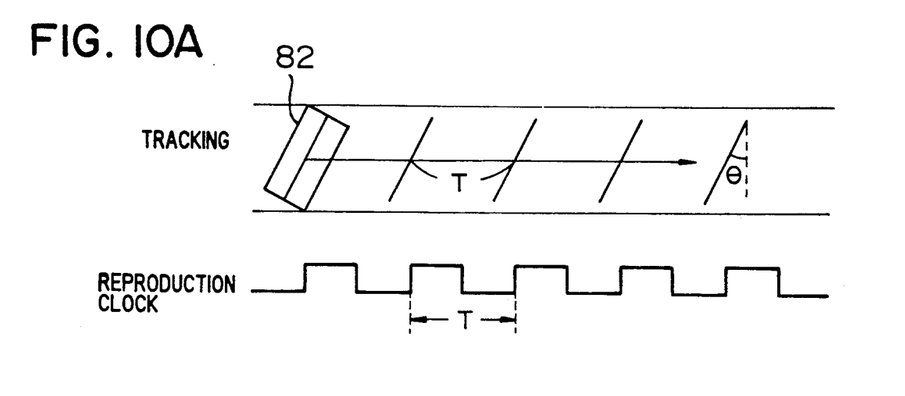
FIGS. 10A through 10C are diagrams showing displacement in tracking of the magnetic heads.
Figure 10B:
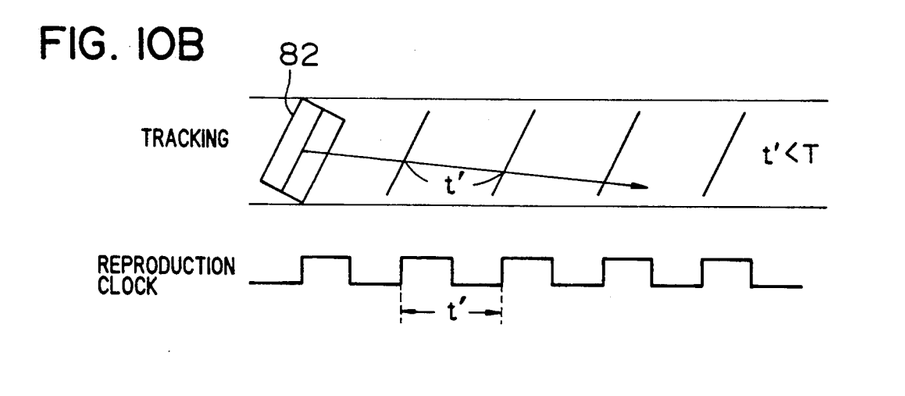
Figure 10C:
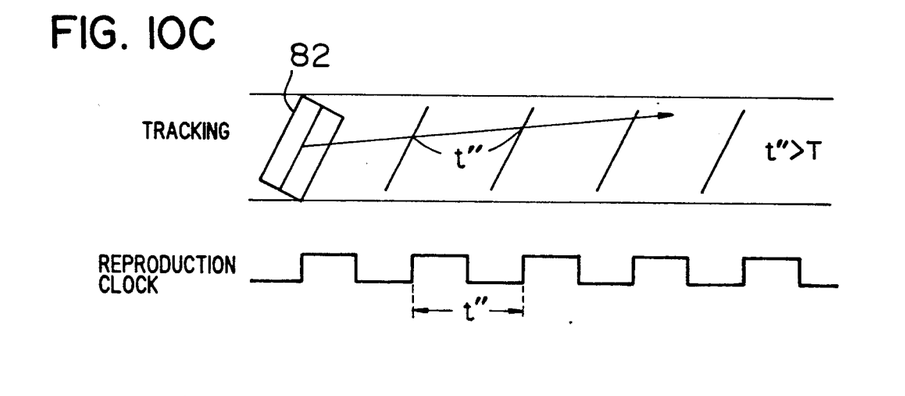

FIGS. 10A through 10C show displacement of tracking of the magnetic head 82. Recording/reproducing is made on a track by the magnetic head 82 with an azimuth $\theta$. When tracking is performed normally as shown in FIG. 10A, the period of the reproduction clock signal takes a fixed value T. If the tracking is displaced as shown in FIG. 10B, the period $t'$ of the reproduction clock signal becomes smaller than T ($t' < T$). If the tracking is displaced as shown in FIG. 10C, on the contrary, the period $t''$ of the reproduction clock signal becomes larger than T ($t'' > T$).

In the tracking error detection circuit 88 shown in FIG. 9, therefore, the reproduction clock signal is subject to frequency-division by n (n being a positive integer). Next, the period of the output signal of the differential circuit 92 is measured by the period measuring counter 93 which is actuated to operate by a free oscillation clock signal and which is reset by a pulse generated from the differential circuit 92. Thus, the period of the output of the differential circuit 92 is to be n·T in normal tracking. Accordingly, an error in period, that is, a value obtained by subtracting n·T from the period of the output of the differential circuit 92 represents displacement of tracking in this period. That is, when the detected error in period is negative, tracking is displaced in such a manner as shown in FIG. 10B, while the detected error in period is positive, tracking is displaced in such a manner as shown in FIG. 10C. Therefore, the integration of the error in period, that is, the deviation of the period of the output of the differential circuit 92 from the reference period n·T is used as a tracking error output. In short, it will do to adjust tracking so as to make the tracking error output be zero.

In this method, however, there is a possibility that an influence of jitter may cause maloperation.

Then, referring to the drawings, description will be made as to an embodiment in which jitter is taken into consideration.

Figure 11:
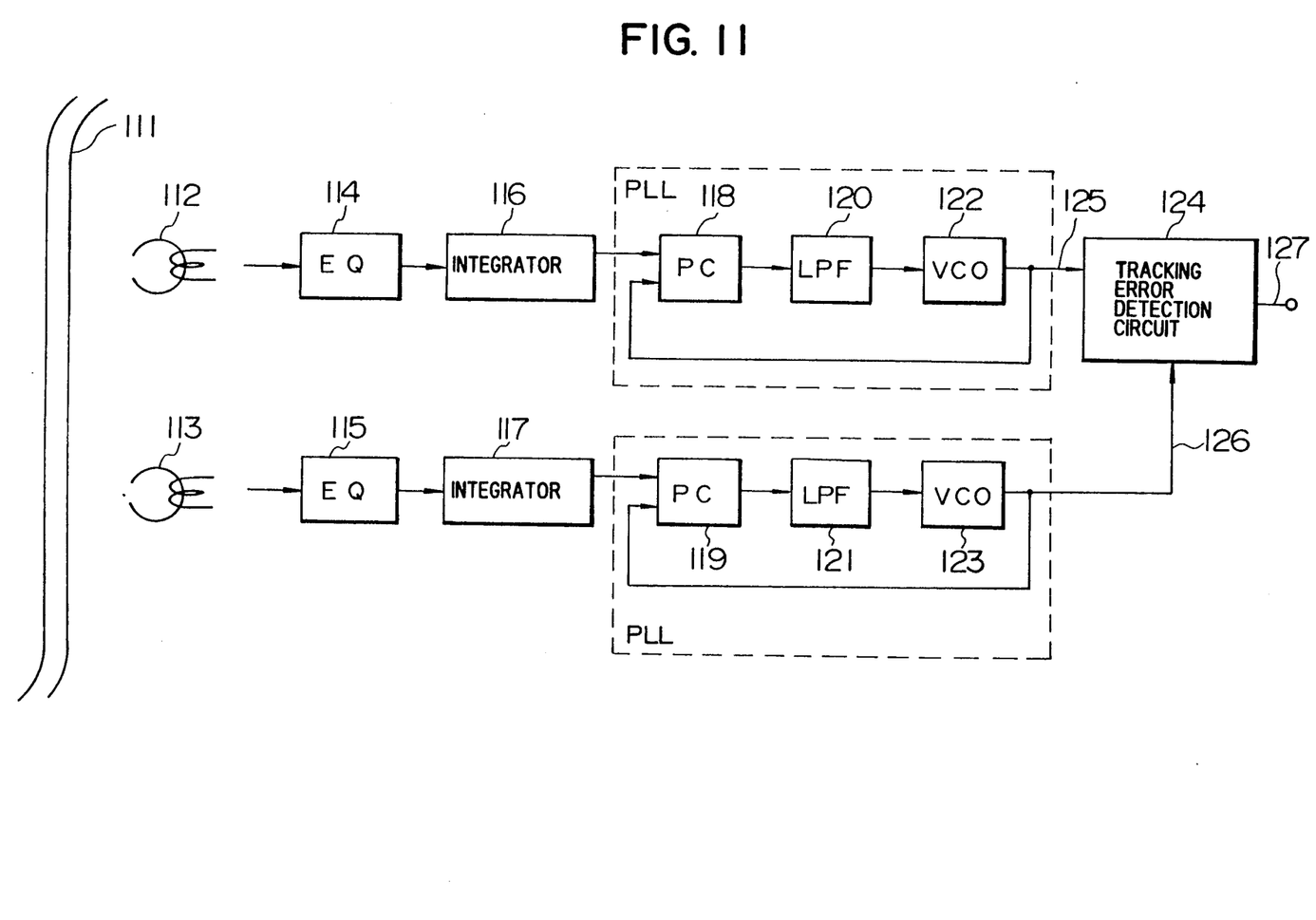
FIG. 11 is a block diagram illustrating main part of an embodiment of the tracking error detection system having a third configuration according to the present invention.

FIG. 11 is a block diagram showing main portions of an embodiment of the tracking error detection system having a third configuration according to the present invention. The system of the embodiment includes: a magnetic tape 111; a multi-head magnetic head having two magnetic heads 112 and 113 disposed on a single base respectively with azimuths opposite to each other; equalizer circuits (EQ) 114 and 115 each constituted by a reproduction amplifier circuit and a transversal filter so as to amplify the digital signal reproduced by the corresponding magnetic head and then correct the frequency characteristic of the amplified digital signal to make the frequency characteristic be a differential characteristic; integrating circuits 116 and 117 for integrating the respective outputs of the equalizer circuits 114 and 115 for integrating the outputs of the equalizer circuits 114 and 115 so as to convert those outputs to make them have the same cosine roll-off waveforms as those of the origianl digital signals respectively; phase comparators (PC) 118 and 119; low-pass filters (LPF) 120 and 121; and voltage-controlled oscillation circuits (VCO) 122 and 123. The phase comparators 118 and 119, the low-pass filters 120 and 121, and the voltage-controlled oscillation circuits 120 and 121 constitute usual phase-locked loops (PLLs) which generate reproduction clock signals 125 and 126 phase-synchronized with the reproduced digital signals respectively. The system further includes: a tracking error detection circuit 124 for detecting a tracking error on the bases of the reproduction clock signals 125 and 126; and an output terminal 127.

Figure 12:
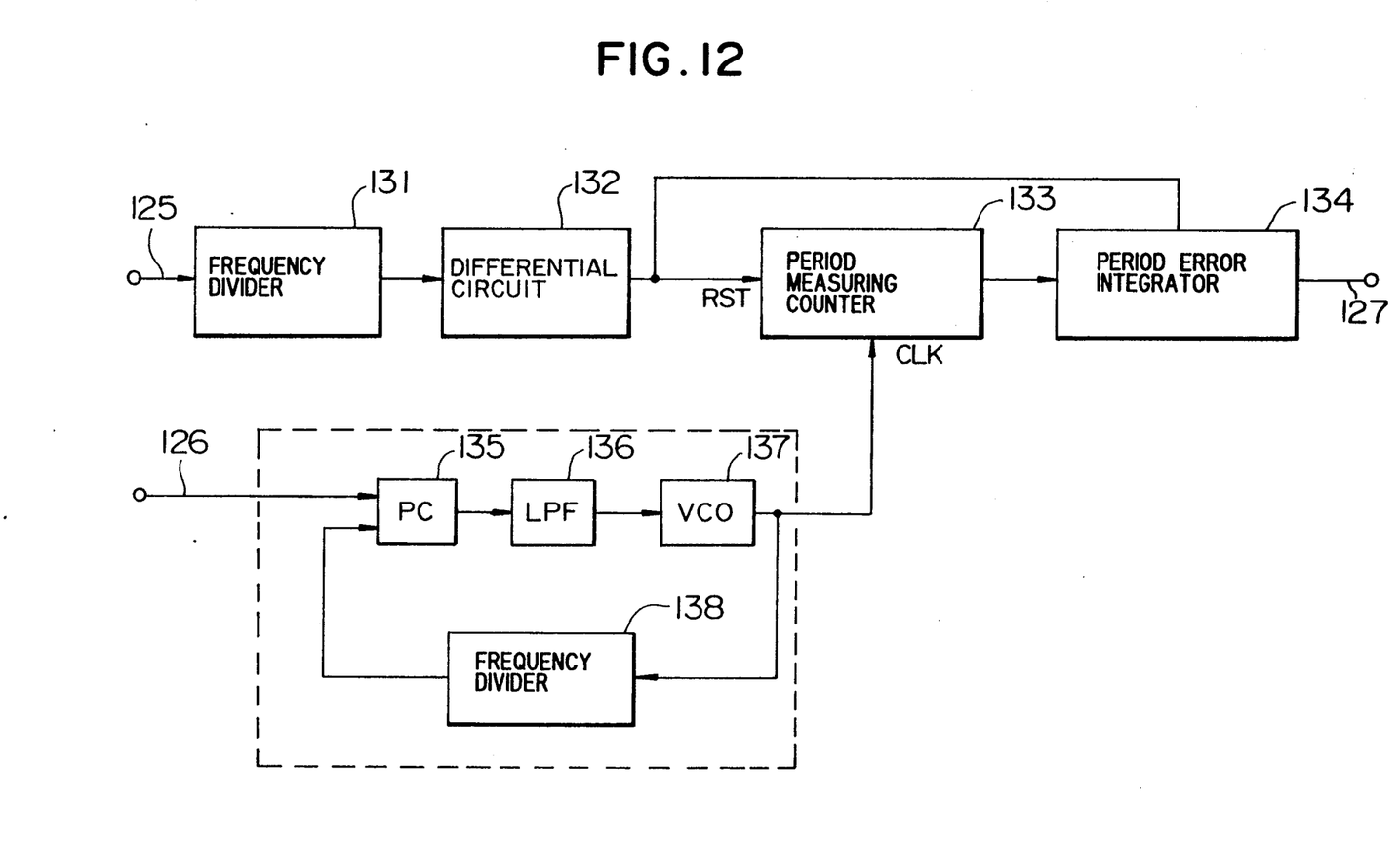
FIG. 12 is a block diagram illustrating main part of the tracking error detection circuit 124.

FIG. 12 is a block diagram showing the configuration of the tracking error detection circuit 124. In the drawing, the tracking error detection circuit 124 includes a frequency dividing circuit 131 for dividing the frequency of the reproduction clock signal 125; a differential circuit 132 for generating a one-shot pulse at the leading edge of the output of the frequency dividing circuit 131; a counter 133 for measuring a period of a pulse which is the output of the differential circuit 132; an integrating circuit 134 for integrating a difference between the period actually measured by the period measuring counter 133 and a reference value, that is, the period in normal tracking; a phase comparator 135; an low-pass filter 136; a voltage-controlled oscillator 137; and a frequency-dividing circuit 138. The phase comparator 135, the low-pass filter 136, the voltage-controlled oscillator 137, and the frequency-dividing circuit 138 constitute a phase-locked loop acting as a frequency multiplying circuit which generates a clock signal for the counter, the clock signal being phase-synchronized with the reproduction clock signal 126 and obtained by multiplying the reproduction clock signal 126.

The operation of the tracking error detection circuit 124 having such a configuration will be described hereunder. The tracking error detection system of this embodiment having such a configuration as described above is substantially the same as that of the embodiment of the second configuration, except that the former is different from the latter in that the former is provided with the multi-head magnetic head having two magnetic heads 112 and 113 so that a tracking error is detected on the basis of the ratio between the two reproduction clock signals reproduced by the magnetic heads 112 and 113.

Figure 13A:
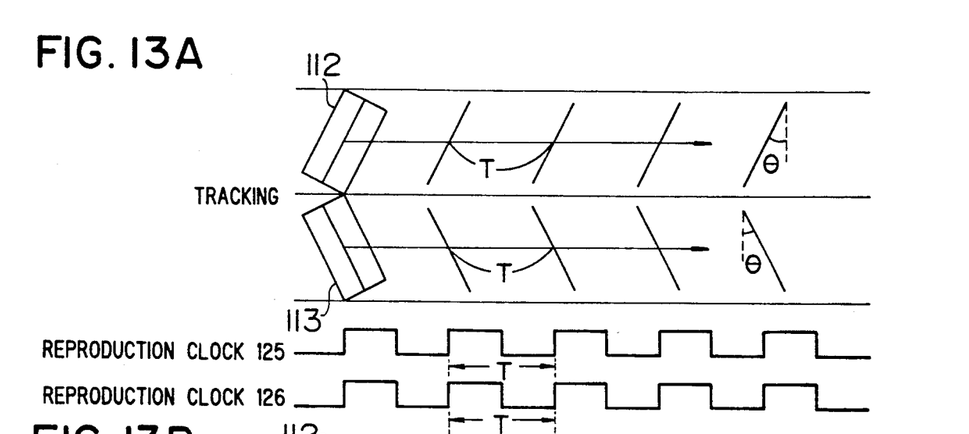
FIGS. 13A through 13C are diagrams showing displacement in tracking of the magnetic heads.
Figure 13B:
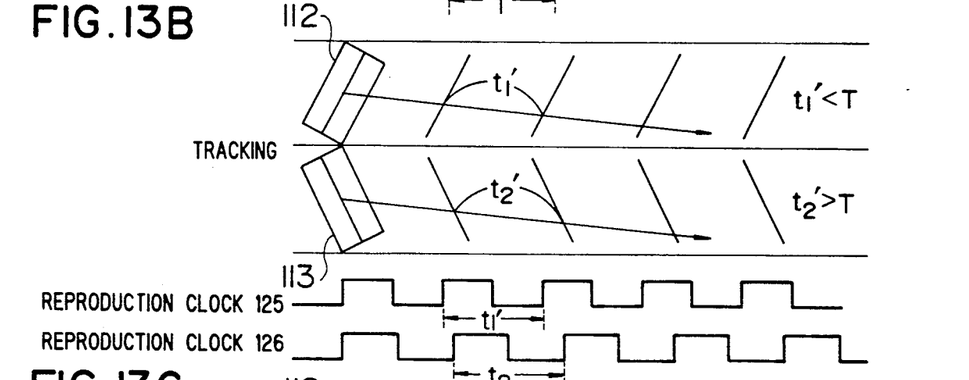
Figure 13C:
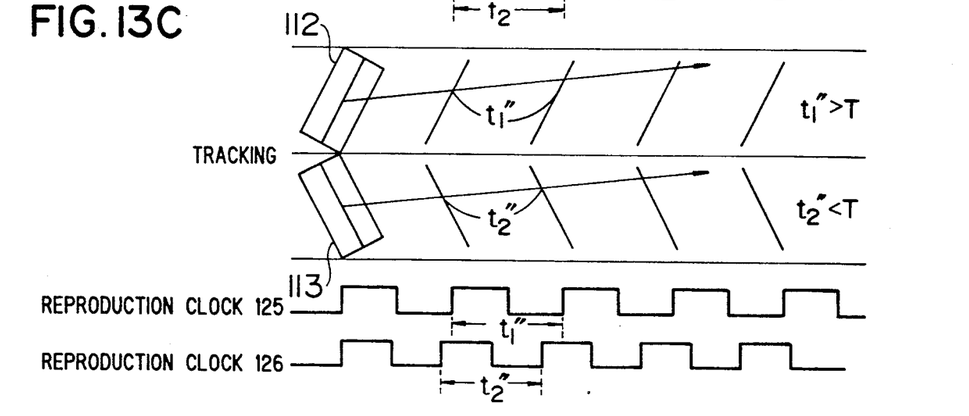

FIGS. 13A through 13C show displacement of tracking in the magnetic heads 112 and 113. Recording/reproducing is made on two tracks by the respective magnetic heads 112 and 113 with azimuths $\pm\theta$ opposite to teach other.

When tracking is performed normally as shown in FIG. 13a, both the periods of the reproduction clock signals 125 and 126 take the same fixed values T. Further, the period A of an output signal of the frequency dividing circuit 131, which is obtained by dividing the frequency of the reproduction clock signal 125 by $n_1$ ($n_1$ being a positive integer), is $n_1 \cdot T$ ($A = n_1 \cdot T$). The period B of an output signal of the frequency multiplying circuit constituted by the phase comparator 135, the low-pass filter 136, the voltage-controlled oscillator 137, and the frequency-dividing circuit 138, which is obtained by multiplying the reproduction clock signal 126 by $n_2$ ($n_2$ being a positive integer), is $T/n_2$ ($B = T/n_2$). The counter value N of the period measuring counter 133 is therefore $n_1 \cdot n_2$ ($N = n_1 \cdot n_2$). If tracking is displaced as shown in FIG. 13B, the period $t_1'$ of the reproduction clock signal 125 becomes smaller than T, and the period $t_2'$ of the reproduction clock signal 126, on the contrary, becomes larger than T. Since the period $A = n_1 \cdot t_1$, and the period $B = t_2'/n_2$ at this time, the count value $N'$ of the period measuring counter 133 becomes as follows:

$$N' = n_1 \cdot n_2 \cdot (t_1'/t_2') < N$$

If the tracking is displaced as shown in FIG. 13C, on the contrary, the period $t_1''$ of the reproduction clock signal 125 becomes larger than T, and the period $t_2''$ of the reproduction clock signal 126 becomes smaller than T. Since the period $A = n_1 \cdot t_1''$ and the period $B = t_2''/n_2$ similarly to the foregoing case, the count value $N''$ of the period measuring counter 133 becomes as follows:

$$N'' \times n_1 \cdot n_2 \cdot (t_1''/t_2'') > N$$

Therefore, it is possible to detect the tracking error in the same manner as in the embodiment of the second configuration. Further, although the tracking error is detected on the basis of the period of only one reproduction clock signal in the embodiment of the second configuration, the tracking error is detected on the basis of the ratio between two reproduction clock signals reproduced by the magnetic heads with azimuths opposite to each other in the embodiment of the third configuration. In this case, the periods of the two reproduction clock signals change reversely to each other in response to displacement of tracking. Accordingly, the detection sensitivity in the embodiment of the third configuration is higher than that in the embodiment of the second configuration.

Figure 14A:
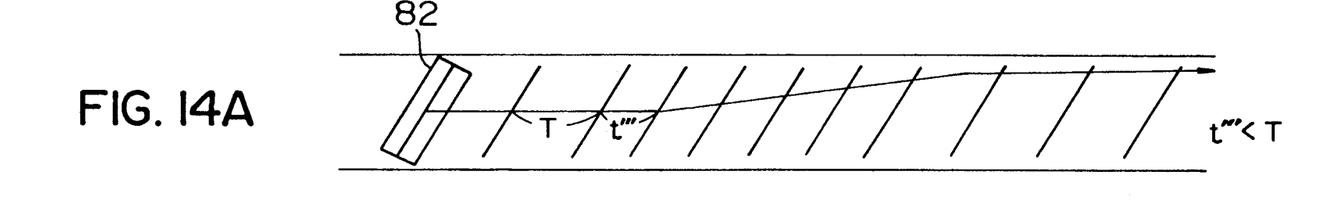
FIG. 14A and 14B are diagrams showing tracking under existence of jitter.
Figure 14B:
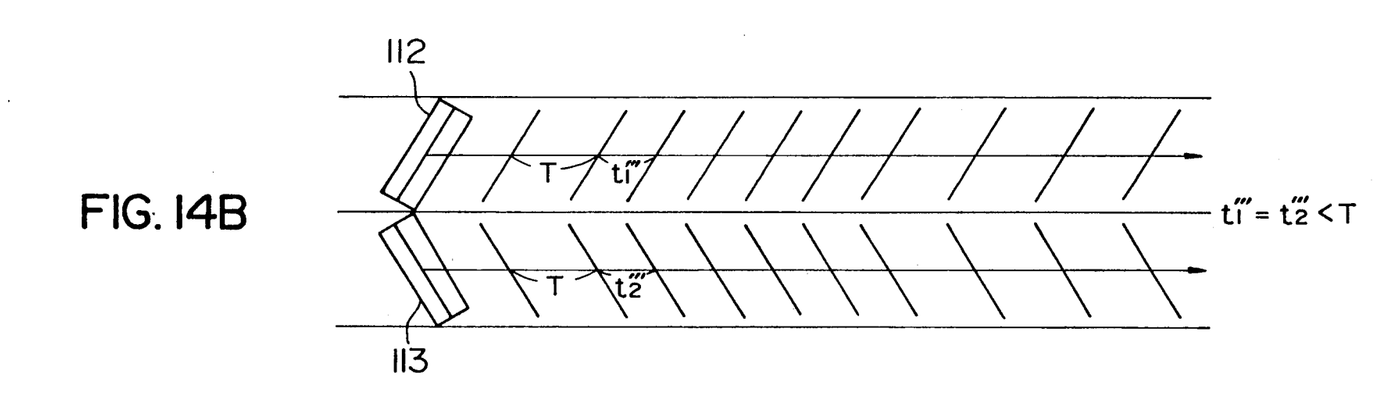

Next, the influence of jitter will be described. FIGS. 14A and 14B show tracking under the condition of occurrence of jitter.

FIG. 14A shows the case of the embodiment of the second configuration. If the period of the reproduction clock signal is made short by jitter on the way, the period measured by the period measuring counter becomes short so that the head is displaced upward in the drawing. FIG. 14B shows the case of the embodiment of the third configuration. The periods $t_1''$ and $t_2''$ are made to change by the influence of jitter as follows.

$$t_1''' = t_2''' = t''' < T.$$

Since the period $A = n_1 \cdot t'''$ and the period $B = t'''/n_2$, however, the value $N'''$ of the period measuring counter 133 becomes $N''' = n_1 \cdot n_2 = N$. Accordingly, no change is generated in the count value of the counter. It is therefore found that tracking can be performed normally without being affected by jitter.

We claim:

1. A tracking error detection system, for a digital magnetic recording/reproducing apparatus for recording/reproducing digital signals on/from first and second recording tracks on a magnetic tape, said system comprising:

a multi-head magnetic head assembly having a single base, a first head and a second head disposed in a multiple configuration on said base, said first head for recording/reproducing a first digital signal on/from said first recording track and said second head for recording/reproducing a second digital signal on/from said second recording track, said first head being oriented to have a first azimuth having any angle between zero and thirty degrees for outputting a first reproduction signal and said second head being oriented to have a second azimuth having any angle between zero and thirty degrees in an opposite direction to said first azimuth for outputting a second reproduction signal;

a first PLL circuit for generating a first clock signal on the basis of said first reproduction signal;

a second PLL circuit for generating a second clock signal on the basis of said second reproduction signal; and a phase comparator unit for comparing the respective phases of the first and second clock signals, wherein said phase comparator unit comprises a first frequency dividing circuit receiving and frequency dividing said first clock signal so as to have a first low frequency in a dynamic range for detecting tracking errors and providing a first output signal, a second frequency dividing circuit receiving and frequency dividing said second clock signal to have a second low frequency in said dynamic range and providing a second output signal and a phase comparator circuit for comparing phases of said first output signal and said second output signal to determine a phase difference therebetween.

2. A tracking error detection system according to claim 1, wherein said first reproduction signal and said second reproduction signal each have a synchronizing pattern signal indicating a time base reference, said synchronizing pattern signal of said first reproduction signal and said synchronizing pattern signal of said second reproduction signal having a predetermined phase difference relative to each other, said system further comprising:

a first processing circuit for processing said first reproduction signal to output a first processed signal based upon said first reproduction signal;

a second processing circuit for processing said second reproduction signal to output a second processed signal based upon said second reproduction signal;

a first synchronism detecting circuit receiving said first processed signal for detecting therein said synchronizing pattern signal of said first reproduction signal and, when a detection thereof occurs, providing a first timing signal to said first frequency dividing circuit, and a second synchronism detecting circuit receiving said second processed signal for detecting therein said synchronizing pattern signal of said second reproduction signal and, when a detection thereof occurs, providing a second timing signal to said second frequency dividing circuit, and wherein said phase comparator circuit determines said phase difference between said first output signal and said second output signal to be reproduced through said first frequency dividing circuit and said second frequency dividing circuit respectively in accordance with said first timing signal and said second timing signal.

* * * * *